US005483442A

United States Patent [19]
Black et al.

[11] Patent Number: 5,483,442
[45] Date of Patent: Jan. 9, 1996

[54] ACCIDENT DOCUMENTATION SYSTEM

[75] Inventors: Barry Black, League City; David Mowry; Gary Smith, both of Clear Lake Shores, all of Tex.

[73] Assignee: Investigator Marketing Inc., Houston, Tex.

[21] Appl. No.: 273,724

[22] Filed: Jul. 12, 1994

[51] Int. Cl.$^6$ .................................................. G06F 19/00
[52] U.S. Cl. ............................................................ 364/400
[58] Field of Search ..................................... 364/400, 401, 364/419.19, 406, 408; 395/153, 154, 149, 161

[56] References Cited

U.S. PATENT DOCUMENTS

| | | | |
|---|---|---|---|
| D. 289,869 | 5/1987 | Woolley | D14/72 |
| 2,868,098 | 4/1956 | Lopez | 95/11.5 |
| 4,916,611 | 4/1990 | Doyle | 364/401 |
| 5,128,859 | 7/1992 | Carbone | 364/401 |
| 5,305,033 | 4/1994 | Takahashi | 354/76 |

FOREIGN PATENT DOCUMENTS 2252836  8/1992  United Kingdom ......... G03B 15/035

*Primary Examiner*—Donald E. McElheny, Jr.
*Attorney, Agent, or Firm*—Harrison & Egbert

[57] ABSTRACT

An accident documentation system comprising an accident documentation assembly and a computerized tracking system integrated therewith. The accident documentation assembly comprises a strap fixedly attached to pouch, with a plurality of members coordinated to routinely document an automobile accident. Slidably attached to this strap through an elongated slot is a substrate upon which is imprinted documentation-directing indicia. The accident documentation assembly includes a camera for visually recording the accident scene and continuous-feed pen and a marker for recording the accident scene on predefined forms and involved pavement, as appropriate. Also included in this assembly is a flashlight for securing the accident scene at night or under exigent conditions characterized by smoke and the like. To avoid flashlight and camera from malfunctioning because of battery and film expiration problems, a computerized tracking system is provided for calculating expected longevity of batteries and film, and then generating, in turn, a replacement warning and a notice to promote proper operation of such flashlight and camera.

19 Claims, 7 Drawing Sheets

FIG. 3A

Accident Documentation System
Driver Investigation Checklist — 15

- Stop and secure vehicle.
- Set warning devices. (triangles, etc)
- Assist the injured.
- Eliminate potential fire hazards.
- Notify police, ambulance.
- Mark pavement with the tire location of each vehicle involved in accident. (use tire crayon provided in kit)
- Take photographs. (See photo checklist)
- Discuss accident only with proper authorities. "Do not admit fault"
- Find witnesses/gather information. (use witness cards supplied)
- Fill out company/insurance accident report form(s).
- Contact company official. (use accident notification card supplied if you can't leave the scene)
- Return entire accident documentation kit to company official.

The above-mentioned should be done in whatever order necessary to protect the accident scene and save lives.

Accident Documentation System
Photo Checklist — 15

DON'T
- Photograph accident injured victims.

DON'T
- Photograph accident scene from all four sides at a distance.

- Photograph all four sides of each vehicle involved.
- Photograph all witnesses with permission.
- Photograph interior of other vehicles involved if possible; i.e. odometer, radar detectors, cans/bottles, headsets.
- Photograph contributing road hazards, i.e. potholes, bumps, obstructions.
- Photograph other contributing conditions, i.e. overhanging branches, bushes, damaged or missing road signs or signals.

Your Vehicle Information

Make: _____ Model: _____
Year: _____ License plate #: _____
Vehicle #: _____
State of Registration: _____

Vehicle No. 2

Make: _____ Model: _____
Year: _____ License plate #: _____
Name of Driver: _____
Address: _____
State of Registration: _____
Owner's Name: _____
Address: _____
Telephone Number: _____
Insurance Co. _____
Policy Number: _____

Vehicle No. 3

Make: _____ Model: _____
Year: _____ License plate #: _____
Name of Driver: _____
Address: _____
State of Registration: _____
Owner's Name: _____
Address: _____
Telephone Number: _____
Insurance Co. _____
Policy Number: _____

Conditions

Road: ☐ Single lane ☐ 2 Lane ☐ 3 Lane ☐ 4 Lane
☐ Daylight ☐ Darkness ☐ Rural ☐ City
Road Surface: _____
Weather Conditions: _____

Injured Persons

Name: _____ Age: _____
Extent of Injury: _____
Name: _____ Age: _____
Extent of Injury: _____
Name: _____ Age: _____
Extent of Injury: _____

Police Investigation

Did the Police investigate the accident? _____
Police Officer's Name: _____
Badge # _____ Precinct: _____
Was a Citation Issued? _____
Who was cited? _____
Reason for Citation(s): _____
Was anyone arrested? _____
Who was arrested? _____
Charges for arrest: _____

Other Property Damages

Diagram of Accident

Witnesses

Please Print.
Name: _____
Address: _____

Home Phone: ( )
WorkPhone: ( )
Please return this card to the driver.
Thank You.

Please Print.
Name: _____
Address: _____

Home Phone: ( )
Work Phone: ( )
Please return this card to the driver.
Thank You.

Please Print.
Name: _____
Address: _____

Home Phone: ( )
Work Phone: ( )
Please return this card to the driver.
Thank You.

FIG. 4B

Description of the Accident

Your Description of the Accident: _____

_____
_____
_____
_____
_____
_____
_____
_____
_____
_____

Signature: _____
Date: _____

Damage to Property

Owner: _____
Address: _____

Damaged Property: _____
Extent of Damage: _____

Owner: _____
Address: _____

Damaged Property: _____
Extent of Damage: _____

Owner: _____
Address: _____

Damaged Property: _____
Extent of Damage: _____

Your Help Please

Your help in relaying the following information will be appreciated.

□ Please call nearest police
  □ Request medical aid
  □ Request fire department aid □ Please call
(Reverse phone charges) at:
Phone: _____
       (area code)

or

Night Phone: _____
             (area code)

Address: _____
Driver's Name: _____
Date: _____ Time: _____

ACCIDENT DOCUMENTATION SYSTEM

BACKGROUND OF THE INVENTION

This invention relates to motor vehicles accidents, and more particularly relates to apparatus and methods for documenting motor vehicle accidents under typically exigent circumstances.

It is common knowledge that people involved in automobile accidents and the like are usually under stress and shock. Injuries to themselves or to family and friends demand considerable energy and attention. Accordingly, documenting the circumstances of such accidents, for insurance or other purposes, is typically inadequate. Unfortunately, important details pertaining to an accident scene are rarely available when needed either by victims reporting the accident or by authorities evaluating the circumstances and ramifications thereof.

At the scene of an accident, there is usually a considerable delay before police and/or medical assistance arrives. Prior to the arrival of such professional assistance, accident victims engage in self-help or, if available, benefit from help provided by concerned bystanders. Absent the arrival and assistance of the police and the like, however, documenting an accident scene is hit-or-miss. If a victim is physically and mentally able, he or she may exchange basic information with other persons involved in the accident. Such basic information includes name, address, and telephone number and drivers' license and possibly insurance carders and policy number. But important scenario-related information, such as description and diagram of the accident, vehicle identification, witnesses or potential witnesses, and extent of physical injury and property damage, is typically omitted. Indeed, such scenario-related information, obviously critical for processing insurance claims and, of course, deciding litigation prospects, is hardly even considered at the time of the accident.

As is well known in the art, there have been a plethora of first aid emergency kits commercially available for storing in an automobile trunk or glove compartment. Such kits, however, have been designed to help render aid for routine cuts and bruises and to place warning devices like emergency cones and flares on the road, especially at night time. Emergency kits frequently provide a flashlight and perhaps even some form of instructions. But these first aid and emergency kits routinely are parked in a trunk for an indefinite duration and such time-dependant devices as battery-operated flashlights are non-functional when suddenly called into service.

There have been several improvements in the art to provide visual recording devices and the like which combine such functions as camera, tape recorder, radio, flashlight, etc. For example, in U.S. Pat. No. 5,305,033, Takahashi et at. teach a combination camera and flashlight for recording visual information. This device is particularly useful for police and security operation, but is cumbersome for documentation purposes at the scene of an automobile accident and the like. As another example, Wheelan, in U.K. Patent Application G.B. 2,252,836, teaches a torch and camera assembly also suitable for use in security situations. Indeed, the Wheelan assembly may include a visible laser configured such that a beam thereof impinges upon a portion of the area to which the camera lens is directed.

In U.S. Pat. No. Des. 289,869, Woolley discloses an ornamental design for a combined radio, tape recorder, binoculars, camera, clock, calculator, compass, and flashlight. While this device could be strapped about the neck of an accident victim or bystander, it appears to be too bulky and heavy to be suitable for documenting an automobile accident and the like, wherein the exigent circumstances thereof require devices which are effective but must be nonintrusive and lightweight. As yet another example of improvements in the art, Lopez, in U.S. Pat. No. 2,868,098, teaches a casing for a camera having an articulated cabinet for a radio receiver and camera. Again, while providing a convenient device for combining recording visual information, and listening to audio information, the Lopez device would not be suitable for documenting motor vehicle accidents and the like.

An important aspect of devices intended for use for documenting motor vehicle accidents is that battery-powered components thereof must be operational when suddenly called into service. Such components as batteries and film are susceptible to deterioration due to extreme temperature conditions and other environmental conditions such as smoke and water. Accordingly, it is disadvantage of the prior art that there appears to be a paucity of means and methods for tracking such time-sensitive devices to prevent or minimize operational malfunctions when needed.

Of course, there have been several computerized systems taught in the art that keep track of automobile accidents, insurance claims, and the like. For example, Doyle et at., in U.S. Pat. No. 4,916,611, teach an insurance administration system with means to allow an employer to communicate employee status data to centralized storage means. This system provides current information to health care service providers pertinent to patient coverage, including the identity of patients covered and services provided. As another example, in U.S. Pat. No. 5,128,859, Carbone et al., disclose an electronic estimating system for substantiating estimates of accident damage. This system also provides for online archiving of accident damage estimates.

While, as hereinbefore exemplified, practitioners in the art have attempted to improve the means for capturing visual information by use of combination camera and flashlight devices, and have provided computer systems for tracking insurance-related information and the like, there has been less effort expended to coordinate the components available to document motor vehicle accidents. It would thus be advantageous to provide a method and means for conveniently and comprehensively documenting an automobile accident scene wherein each and every component thereof is coordinated and fully functional period.

Accordingly, these limitations and disadvantages of the prior art are overcome with the present invention, and improved means and techniques are provided which are useful for thoroughly and reliably documenting automobile accidents and the like.

SUMMARY OF THE INVENTION

The present invention provides an accident documentation system comprising an accident documentation assembly and a computerized tracking system integrated therewith. The accident documentation assembly comprises a strap means fixedly attached to retaining means. Slidably attached to this strap means through an elongated slot means is a substrate means upon which is imprinted, in an overlapping relationship, on both surfaces thereof, documentation-directing indicia.

As will be described in detail, it is a feature and advantage of the preferred embodiment that the accident documentation assembly comprises a plurality of members which have been coordinated to afford a means and method for routinely documenting an automobile accident and the like, under typically exigent circumstances, notwithstanding that accident victims are predictably suffering from injury, shock and duress.

In accordance with the present invention, this accident documentation assembly includes a camera means for visually recording the accident scene and writing and marker means for further recording the accident scene on predefined forms and the involved pavement, as appropriate. The accident documentation assembly also includes illumination means for securing the accident scene at night or under exigent conditions characterized by smoke and the like.

In accordance with the present invention, these members are contained within retaining means and may be readily accessed to provide accident documentation with a regularity heretofore unknown in the art. To avoid battery-driven illumination means and camera means from suffering from malfunction because of expiration problems and the like, the present invention also comprises a computerized tracking system for calculating expected longevity of such time-sensitive components, and then generating, in turn, a replacement warning and a notice to promote proper operation of battery-operated components and the camera means.

Accordingly, means are provided to enable automobile accidents to be uniformly and comprehensively documented and reported to the proper authorities and insurance carriers, without jeopardizing the safety and health of the accident victims, and without requiting additional inquiries to be made subsequent to such accident, after important evidence has been altered or is no longer available.

It is an object of the present invention to provide a means for documenting automobile accidents and the like.

It is also an object of the present invention to provide a convenient and inexpensive apparatus for promoting an accident victim or bystander comprehensively documenting an automobile accident and the like, in spite of such accident victim typically suffering from bodily injury or shock.

It is a further object of the present invention to provide a method and apparatus for documenting motor vehicle accidents wherein battery-operated components thereof are virtually assured of being operational when called into service.

It is another object of the present invention to provide a method and apparatus for documenting motor vehicle accidents wherein camera means are virtually assured of being operational when called into service.

It is also an object and feature of the present invention that a means and method are provided to enable an accident victim or bystander to routinely and comprehensively document a motor vehicle accident, under any and all exigent circumstances including darkness, inclement weather, smoke, etc.

It is a specific object of the present invention to provide an accident documentation system having a unique identification number, for use by a person who is either an accident victim or a bystander, said accident documentation system comprising: an accident documentation assembly having a pliable strap means and a plurality of retaining means fixedly attached to said pliable strap means, and configured to be releasably received by said person's neck without inhibiting use of either arms or hands thereof; substrate means having slot means configured to slidably receive said strap means; said substrate means comprising first indicia means for providing direction for documenting a motor vehicle accident disposed on one side of said substrate means in an overlapping relationship therewith and second indicia means for providing directions for documenting a motor vehicle accident disposed on another opposite side of said substrate means in an overlapping relationship therewith; said slot means configured to expose said first indicia means and second indicia means, respectively, by suitably twisting said substrate means to render either of said first indicia means or second indicia means readable to said person; marker means releasably attached to one of said plurality of retaining means, for depicting relationship between a plurality of automobiles involved in said accident scene; writing means releasably attached to one of said plurality of retaining means, for verbally recording said accident scene on a plurality of accident information form means releasably attached to a clipboard means; illumination means releasably attached to at least one of said plurality of retaining means, for providing illumination at said accident scene; and camera means releasably attached to at least one of said plurality of retaining means, for visually recording an accident scene; said camera means having a plurality of additional indicia means for providing directions for documenting a motor vehicle accident and for recording estimated replacement dates for said camera means and said illumination means, disposed on a corresponding plurality of surfaces contained upon said camera means and further disposed in an overlapping relationship therewith; and computerized tracking means based upon said identification number for monitoring service time of said camera means and said illumination means and for notifying said person when to replace said camera means and said illumination means.

These and other objects and features of the present invention will become apparent from the following detailed description, wherein reference is made to the figures in the accompanying drawings.

IN THE DRAWINGS

FIG. 3A depicts a front view of a checklist embodying a portion of the present invention.

FIG. 3B depicts another checklist embodying a portion of the present invention.

FIG. 4A depicts a front view of an information form embodying the present invention.

FIG. 4B depicts another information form embodying the present invention.

DETAILED DESCRIPTION

Figure 1:
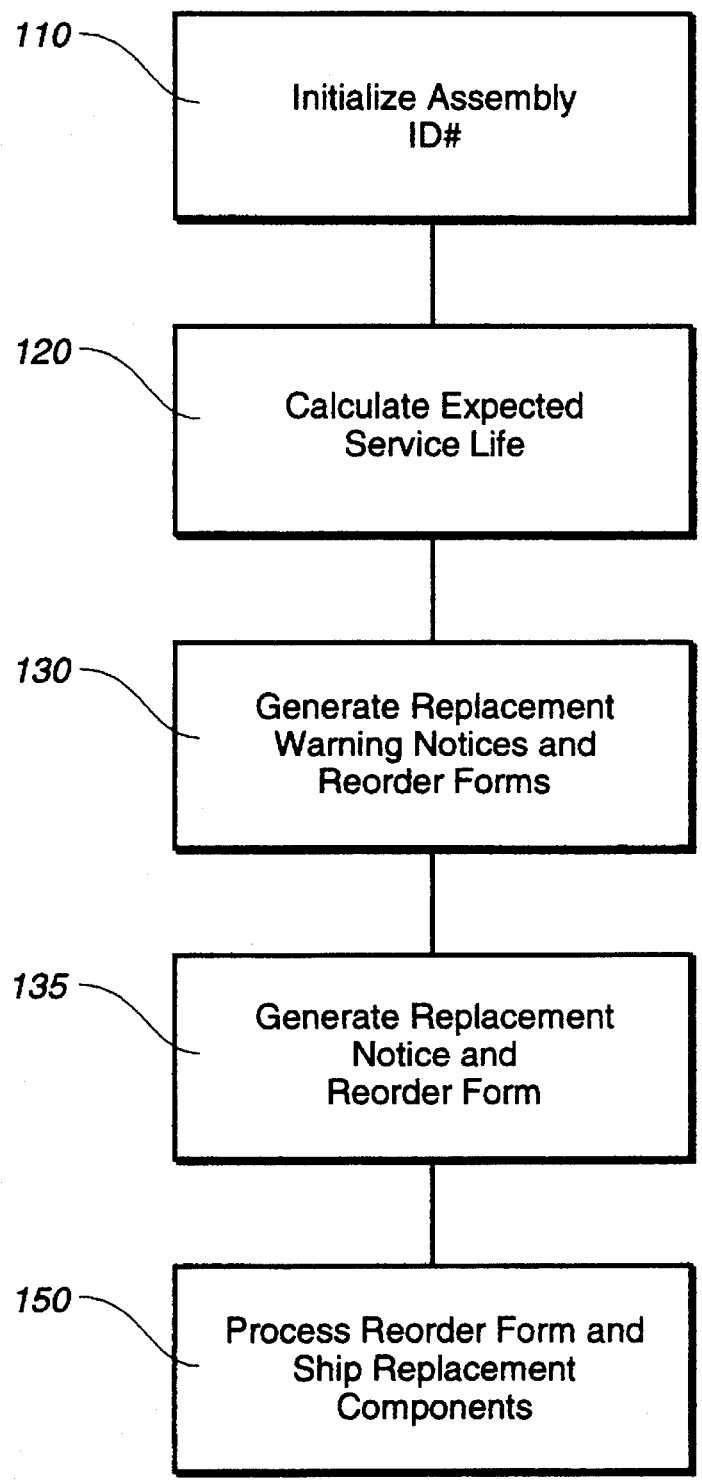
FIG. 1 depicts a simplified flowchart of a computerized tracking system embodying the present invention, for monitoring services times of certain components thereof.
Figure 2:
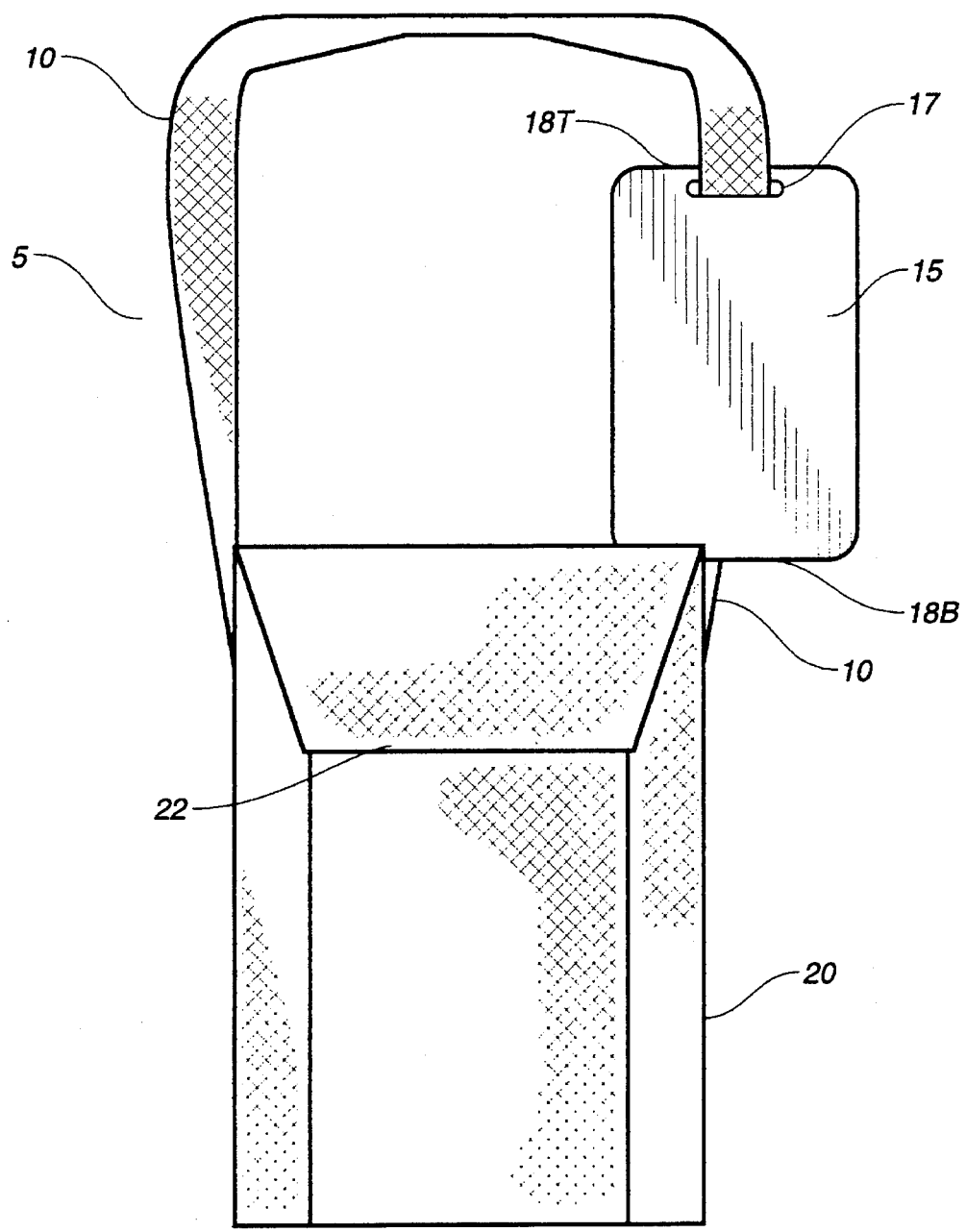
FIG. 2 depicts an accident documentation assembly embodying the present invention.

Referring to FIGS. 1–6 there is depict an automotive documentation system embodying the present invention. Referring specifically to FIG. 2, there is depicted automotive documentation assembly 5 comprising pliable strap means 10 fixedly attached to retaining means 20. In particular, retaining means 20 is shown as a pouch having closure flap 22 which may be secured with Velcro and the like in a manner well known in the art. In accordance with the present invention, strap 10 and retaining means 20 should preferably be constructed from a pliable and reflective material to readily adapt to the neck and shoulder of an accident victim or bystander, and to enhance visibility either at night or under circumstances characterized by heavy smoke or fumes. Also depicted is substrate means 15 which is Slidably attached to strap means 10 through slot means 17.

Still referring to FIG. 2, it will become apparent to those skilled in the art that strap means 10 is placed about the neck of either an accident victim or bystander so that the various components of the present invention may be readily accessed and used, as will be hereinafter described in detail. It has been found that adequate flexibility and visibility may be attained by using a material akin to a 28 gauge vinyl, preferably white or a similar light color. Of course, other materials may be used provided that the behavior taught by the present invention is obtained.

According to the teachings of the present invention, indicia means providing directions for comprehensively documenting a motor vehicle accident, preferably in the form of checklists and the like, are imprinted in an overlapping relationship with substrate means 15, wherein the substrate means may be lifted at edge 18B and pivoted about strap means 10 proximal to slot means 17. The checklist imprinted upon the exposed side of substrate means 15 may then be read to direct the accident scene investigation and documentation. Furthermore, by twisting or rotating substrate means 15 around strap means 10, through slot means 17, the checklist imprinted upon the other opposite side thereof may be exposed, providing additional investigation and documentation directions for an accident victim or bystander.

Referring now to FIGS. 3A and B, there are shown driver investigation checklist and a photo checklist, respectively, which may be imprinted upon opposite surfaces of substrate means 15. As hereinbefore described, a person wearing accident documenting assembly 5 may simply lift substrate means 15 to review a checklist and the like imprinted on one side thereof, or twist or pivot substrate means 15 to review another checklist imprinted on the opposite side thereof. As will become apparent to those skilled in the art, checklists and the like, as illustrated in FIGS. 3A and 3B, are imprinted in an overlapping relationship with substrate means 15 such that the respective checklists may be read in a top down direction from end 18B to end 18T thereof. This orientation, of course, enables the person using the present invention to simply pivot end 18B of substrate means 15 to read either the driver investigation checklist depicted in FIG. 3A or the photo checklist depicted in FIG. 3B or the equivalent.

Referring now to FIGS. 4A and 4B, there are shown forms F1 and F2, respectively, which are releasably attached to a clipboard (not shown), and which are releasably attached to or within retaining means 20. Specifically referring to FIG. 4A, it is seen that form F1 provides a plurality of spaces for accident-related information; more particularly, a person's vehicle information is included in field 50, second in field 55, third vehicle in field 60, accident scene conditions in field 65, injured persons in field 70, police investigation in field 75, other property damages in field 80, witnesses in field 85, and a diagram of the accident scene in field 90. Similarly, in FIG. 4B, there is depicted form F2 having description of accident in field 35, damage to property in field 40, and signature and date areas in field 45. Of course, it should be apparent to those skilled in the art that any sufficiently firm surface such as cardboard and the like may be used as support for filling out necessary accident-related information.

It should be clear that other accident reporting forms may be appropriate to comply with local laws or company procedures. It has also been found to be advantageous to provide witness cards and a detachable notification card with sufficient coinage to make contact with local emergency medical services and the like, through public telephone facilities.

Figure 5:
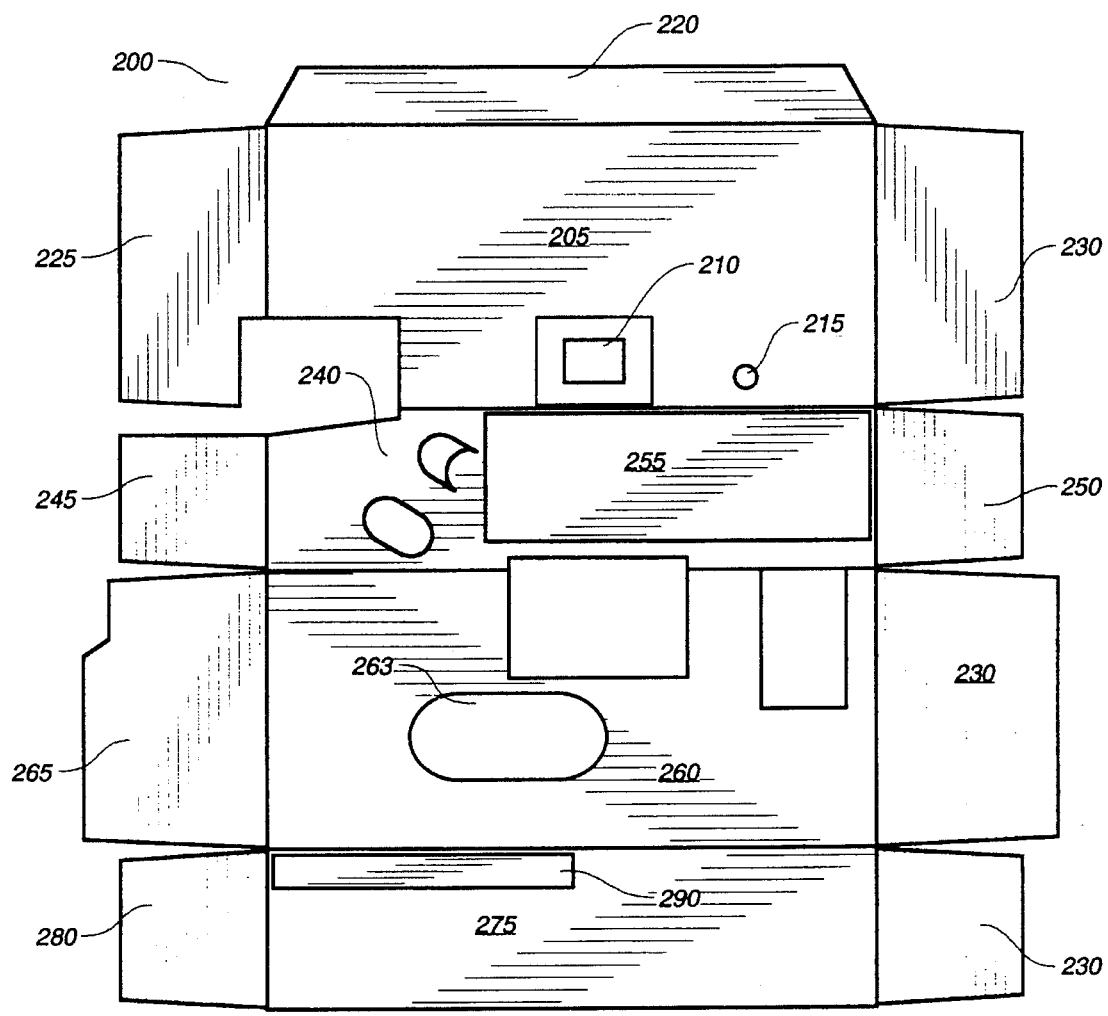
FIG. 5 depicts an unfolded front view of a portion of an embodiment of the present invention.
Figure 6A:
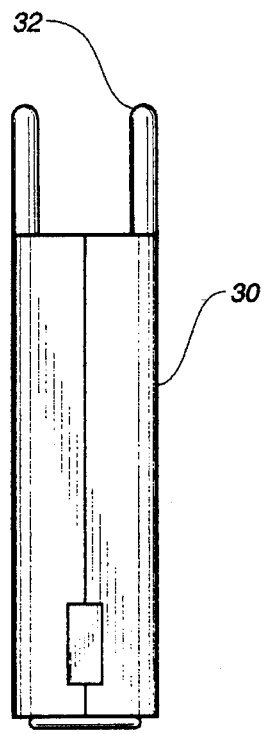
FIG. 6A depicts a side view of a portion of an embodiment of the present invention.
Figure 6B:
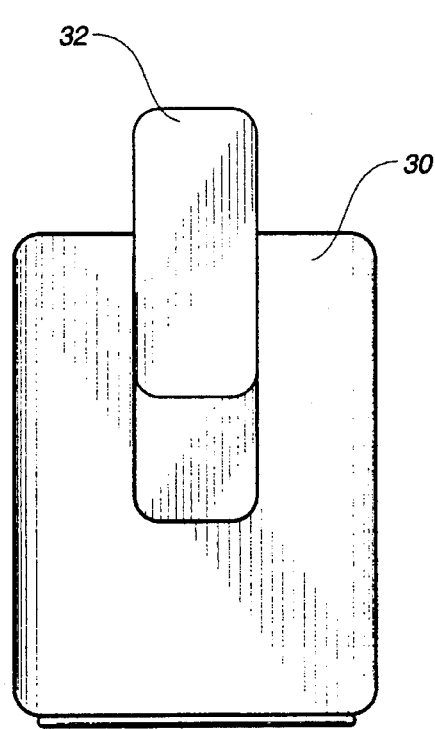
FIG. 6B depicts a top view of a portion of the embodiment of the present invention depicted in FIG. 6A.
Figure 6C:
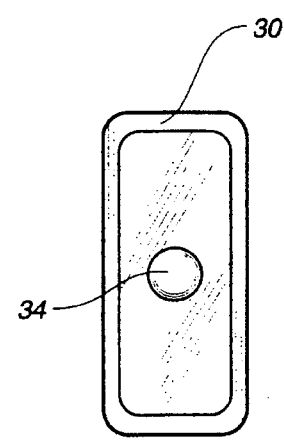
FIG. 6C depicts a front view of a portion of the embodiment of the present invention depicted in FIG. 6A.

Now focusing on FIG. 5, there is depicted an unfolded view of camera means 200. Front surface 260 having lens 263 is shown with adjoining edge portions 265 and 270. Rear surface 205 having view window 210 and ready light 215 is shown with adjoining edge portions 225 and 230. Top surface 240 is shown with adjoining edge portions 245 and 250. Similarly, bottom surface 275 is shown with adjoining edge portions 280 and 285. The preferred embodiment comprises an adaptation of the Kodak "FunTime 35" 35 mm camera which includes an internal flash and is preloaded with high speed color print film. Color print film with an ISO of 400 and preferably with 24 exposures has been found to provide suitable performance under extreme temperature and weather conditions. In accordance with the present invention, checklists and the like may be advantageously affixed to or imprinted upon top surface 240, bottom surface 275 and also edge portions illustrated by 170. Thus, as an example, a photo checklist (FIG. 3B) placed in an overlapping relationship with flap or edge portion 270 and driver investigation checklist (FIG. 3A) may be placed in an overlapping relationship with top surface 240. Surface portion 290 of bottom surface 275, besides checklist information and the like, may contain information indicative of film and battery expiration dates.

Thus, as directed on checklists imprinted upon substrate means 15 or on surfaces of camera means 200, appropriate accident-related information is entered onto forms F1 and F2, or the equivalent. Due to the frequently exigent circumstances under which such entries would have to be made, it is within the teachings of the present invention to include a specially designed pencil which always affords a sharpened pencil point and eraser. As an example, it has been found that Souvenir Inc.'s "auto-sharp" continuous feed lead pencil affords the reliability and ease of operation required for the effective implementation of the present invention. In addition, it has also been found that imprinting documentary information upon paper designed for use in inclement weather, as J.L. Dalling Corp.'s 20 lb. bond 759/m2 paper, safeguards the integrity thereof. Such paper has been formulated to perform in potentially adverse environments like logging camps and golf courses.

Now referring to HGS. 6A, B, and C, there is depicted illumination means 30 which is also preferably attached to or contained within pouch or retaining means 20. In a manner well known in the art, a typical compact flashlight 30 may be activated by pushing upon lever 32, thereby emitting a beam of light through aperture 34. It has also been found to be advantageous to provide a clip light and the like for illuminating forms attached upon a clipboard and the like. Such a light source may be clipped to the clipboard or attached magnetically, in a manner well known in the art.

It is also within the disclosure contemplated by the present invention that to further document an automobile accident and the like, a suitable all-weather asphalt marker and the like may be provided to illustrate the relationship between the involved vehicles and the road surfaces. For example, Dixon Ticonderoga Company's wax marker may be used for marking vehicle or tire locations on nearby pavement.

It should also be appreciated that the accident documentation assembly retaining means taught by the present invention may also be embodied with a plurality of pouches and the like, to accommodate its several components. It should be apparent that there is a tradeoff between retaining particular components separately and thereby quickly retrieving them from a separate pouch, and retaining several components collectively and thereby retrieving them essentially by sight and/or feel. Those skilled in the art should clearly comprehend that either embodiment produces the results taught by the present invention.

According to the teachings of the present invention, checklists and the like are preferably imprinted in an overlapping relationship with substrate means 15, wherein the substrate means may be lifted at edge 18B and pivoted about strap 10 proximal to checklist imprinted on the exposed side of substrate means 15 may then be read to direct the accident scene investigation and documentation. Furthermore, by twisting or rotating substrate means 15 around strap 10, the checklist imprinted upon the other opposite side thereof may be exposed, providing additional investigation and documentation directions for an accident victim or bystander. As heretofore unknown in the art, such investigation directions are likewise imprinted upon appropriate surfaces of camera means 200, as hereinbefore described. Accordingly, by making such directions readily available in a plurality of locations upon a plurality of components comprising the present invention, an accident victim is afforded the surprising benefit of achieving comprehensive documentation of a motor vehicle accident, notwithstanding the exigent circumstances thereof.

Now referring to FIG. 1, there is depicted a simplified flowchart of a computerized tracking aspect of the present invention. To avoid limitations of the prior art wherein battery-operated devices are inoperative because of expired or leaking batteries, the preferred embodiment of the present invention teaches that the expected life of such ephemeral power sources should be carefully be recorded and tracked. Thus, when automobile documentation assembly 5 as depicted in FIG. 2 is distributed as an integral part of the present invention, the recipient thereof should be identified, preferably individually and by company, if applicable, and each assembly should be uniquely identified by a serial number or the like.

As depicted in FIG. 1, computerized tracking system 100 comprises initialization step 110, wherein identification of a particular automobile documentation assembly and its recipient are recorded. Preferably based upon local climactic and environmental conditions, the expected service life of replaceable batteries and film is then performed in calculation step 120. As should be evident to those skilled in the art, such calculations should consider the normal range of temperatures experienced in automobile trunks and glove compartment in a particular locale. For example, in the southwest region of the United States, typified by Houston, Tex. temperature and humidity both exceed 90° F. and 90%, respectively, during late Spring through mid Fall. In the Northwestern regions of the United States, typified by Minneapolis and Chicago, temperature frequently dips below 0° F. during Fall through early Spring.

Referring to FIGS. 1 and 2, according to the present invention, a calendar-based tickler mechanism or the like should preferably be established to issue a timely warning step 130 which precedes a notice step 135 that batteries and/or film should be imminently replaced. Functionally related to the estimated longevity of battery-driven power sources and film, lead or tickler dates may be established on a calendar contained within computerized tracking system 100. Such lead times may be 30–45 days or whatever ticklers prove to be advantageous. Hence, under the present invention, in a time-related sequence device, a recipient of a motor vehicle documentation assembly as described hereinbefore in detail should preferably first receive a replacement warning with a reorder form, and then receive a replacement notice or confirmation, also with a reorder form. Preferably, to maintain the integrity of tracking system 100, and, of course, to assure a fail-safe, a copy of all replacement notices should be sent to a supervisory authority. Thus, for a company comprising many employees, a supervisor or manager should ascertain that all subordinate employees comply with safety standards by maintaining the operability of the present invention.

It is important aspect and advantage of the present invention that an apparatus and method are provided which routines the documentation prerequisite to completely describe automobile accidents and the like despite of the inherent stress, strain, shock and confusion associated with automobile accidents, unexpected comprehensive documentation becomes a routine occurrence because of the extensive coordination afforded as hereinbefore described.

It should be clear, for example, that having reliable power sources for illuminating the accident scene for safety purposes and for safety purposes illuminating a clipboard enabling documentation forms and the like to be completed, is an essential feature of an emergency apparatus typified by the present invention. The availability of ample illumination-enabling power is promoted by issuing notices when batteries and the like should be replaced, or at least tested for power. Similarly, the present invention provides an early warning system for replacing other components such as film.

Another significant aspect of the present invention is that it is designed to support and reinforce the documentation process for a motor vehicle accident. Readily accessible surfaces are provided with repeated directions for comprehensibly documenting an accident scene. As hereinbefore described, checklists are preferably imprinted upon both sides of a slidable and pivotable substrate means which is located on a flexible and preferably reflective strap, located conveniently for twisting and reading. Such checklist advisory information is reinforced by also being imprinted upon camera edge surfaces. Accordingly, even an excited or shocked accident victim may routinely properly and completely document an accident, notwithstanding his or her infirmity.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. An accident documentation system having a unique identification number, for use by a person who is either an accident victim or a bystander, said accident documentation system comprising:

an accident documentation assembly having a pliable strap means and a plurality of retaining means fixedly attached to said pliable strap means, and configured to be releasably received by said person's neck without inhibiting use of either arms or hands thereof;

substrate means having slot means configured to slidably receive said strap means;

said substrate means comprising first indicia means for providing directions for documenting a motor vehicle accident disposed on one side of said substrate means in an overlapping relationship therewith and second indicia means for providing directions for documenting a motor vehicle accident disposed on another opposite side of said substrate means in an overlapping relationship therewith;

said slot means configured to expose said first indicia means and second indicia means, respectively, by suitably twisting said substrate means to render either of said first indicia means or second indicia means readable to said person;

marker means releasably attached to one of said plurality of retaining means, for depicting relationship between a plurality of automobiles involved in said accident scene;

writing means releasably attached to one of said plurality of retaining means, for verbally recording said accident scene on a plurality of accident information form means releasably attached to a clipboard means;

illumination means releasably attached to at least one of said plurality of retaining means, for providing illumination at said accident scene; and camera means releasably attached to at least one of said plurality of retaining means, for visually recording an accident scene;

said camera means having a plurality of additional indicia means for providing directions for documenting a motor vehicle accident and for recording estimated replacement dates for said camera means and said illumination means, disposed on a corresponding plurality of surfaces contained upon said camera means and further disposed in an overlapping relationship therewith; and computerized tracking means based upon said identification number for monitoring service time of said camera means and said illumination means and for notifying said person when to replace said camera means and said illumination means.

2. The accident documentation system recited in claim 1, wherein said first indicia means comprises checklist means including directions for coordinating use of said camera means, said writing means and said marker means at said accident scene.

3. The accident documentation system recited in claim 2, wherein said second indicia means comprises checklist means including directions for coordinating use of said camera means, said writing means and said marker means at said accident scene.

4. The accident documentation system recited in claim 3, wherein said plurality of additional indicia means comprises at least said checklist means comprising said first indicia means and said second indicia means.

5. The accident documentation system recited in claim 1, wherein said slot means is elongated in a rectangular configuration proximal and parallel to an edge of said substrate means.

6. The accident documentation system recited in claim 1, wherein said pliable strap means comprises a reflective material.

7. The accident documentation system recited in claim 1, wherein said plurality of retaining means comprises a reflective material.

8. The accident documentation system recited in claim 1, wherein said plurality of retaining means comprises a plurality of pouch means.

9. The accident documentation system recited in claim 1, wherein said clipboard means is releasably attached to one of said plurality of retaining means.

10. An accident documentation system having a unique identification number, for use by a person who is either an accident victim or a bystander, said accident documentation system comprising:

an accident documentation assembly having a pliable strap means comprising a reflective material and a plurality of retaining means comprising a reflective material and fixedly attached to said pliable strap means, and configured to be releasably received by said person's neck without inhibiting use of either arms or hands thereof;

substrate means having an elongated slot means proximal and parallel to an edge thereof and configured to slidably receive said strap means;

said substrate means comprising first indicia means for providing directions for documenting a motor vehicle accident disposed on one side of said substrate means in an overlapping relationship therewith and second indicia means for providing directions for documenting a motor vehicle accident disposed on another opposite side of said substrate means in an overlapping relationship therewith;

said slot means configured to expose said first indicia means and second indicia means, respectively, by suitably twisting said substrate means to render either of said first indicia means or second indicia means readable to said person;

marker means releasably attached to one of said plurality of retaining means, for depicting relationship between a plurality of automobiles involved in said accident scene;

writing means releasably attached to one of said plurality of retaining means, for verbally recording said accident scene on a plurality of accident information form means releasably attached to a clipboard means;

illumination means releasably attached to at least one of said plurality of retaining means, for providing illumination at said accident scene; and camera means releasably attached to at least one of said plurality of retaining means, for visually recording an accident scene;

said camera means having a plurality of additional indicia means for providing directions for documenting a motor vehicle accident and for recording estimated replacement dates for said camera means and said illumination means, disposed on a corresponding plurality of surfaces contained upon said camera means and further disposed in an overlapping relationship therewith; and computerized tracking means based upon said identification number for monitoring service time of said camera means and said illumination means and for notifying said person when to replace said camera means and said illumination means.

11. The accident documentation system recited in claim 10, wherein said first indicia means comprises checklist means including directions for coordinating use of said camera means, said writing means and said marker means at said accident scene.

12. The accident documentation system recited in claim 11, wherein said second indicia means comprises checklist means including directions for coordinating use of said camera means, said writing means and said marker means at said accident scene.

13. The accident documentation system recited in claim 12, wherein said plurality of additional indicia means comprises at least said checklist means comprising said first indicia means and said second indicia means.

14. The accident documentation system recited in claim 10, wherein said clipboard means is releasably attached to one of said plurality of retaining means.

15. An accident documentation system having a unique identification number, for use by a person who is either an accident victim or a bystander, said accident documentation system comprising:

an accident documentation assembly having a pliable strap means comprising a reflective material and a retaining means comprising a reflective material and fixedly attached to said pliable strap means, and configured to be releasably received by said person's neck without inhibiting use of either arms or hands thereof;

substrate means having an elongated slot means proximal and parallel to an edge thereof and configured to slidably receive said strap means;

said substrate means comprising first indicia means for providing directions for documenting a motor vehicle accident disposed on one side of said substrate means in an overlapping relationship therewith and second indicia means for providing directions for documenting a motor vehicle accident disposed on another opposite side of said substrate means in an overlapping relationship therewith;

said slot means configured to expose said first indicia means and second indicia means, respectively, by suitably twisting said substrate means to render either of said first indicia means or second indicia means readable to said person;

marker means releasably attached to said retaining means, for depicting relationship between a plurality of automobiles involved in said accident scene;

writing means releasably attached to said retaining means, for verbally recording said accident scene on a plurality of accident information form means releasably attached to a clipboard means;

illumination means releasably attached to said retaining means, for providing illumination at said accident scene; and camera means releasably attached to said retaining means, for visually recording an accident scene;

said camera means having a plurality of additional indicia means for providing directions for documenting a motor vehicle accident and for recording estimated replacement dates for said camera means and said illumination means, disposed on a corresponding plurality of surfaces contained upon said camera means and further disposed in an overlapping relationship therewith; and computerized tracking means based upon said identification number for monitoring service time of said camera means and said illumination means and for notifying said person when to replace said camera means and said illumination means.

16. The accident documentation system recited in claim 15, wherein said first indicia means comprises checklist means including directions for coordinating use of said camera means, said writing means and said marker means at said accident scene.

17. The accident documentation system recited in claim 16, wherein said second indicia means comprises checklist means including directions for coordinating use of said camera means, said writing means and said marker means at said accident scene.

18. The accident documentation system recited in claim 17, wherein said plurality of additional indicia means comprises at least said checklist means comprising said first indicia means and said second indicia means.

19. The accident documentation system recited in claim 15, wherein said clipboard means is releasably attached to said retaining means.

* * * * *